United States Patent Office 2,842,398
Patented July 8, 1958

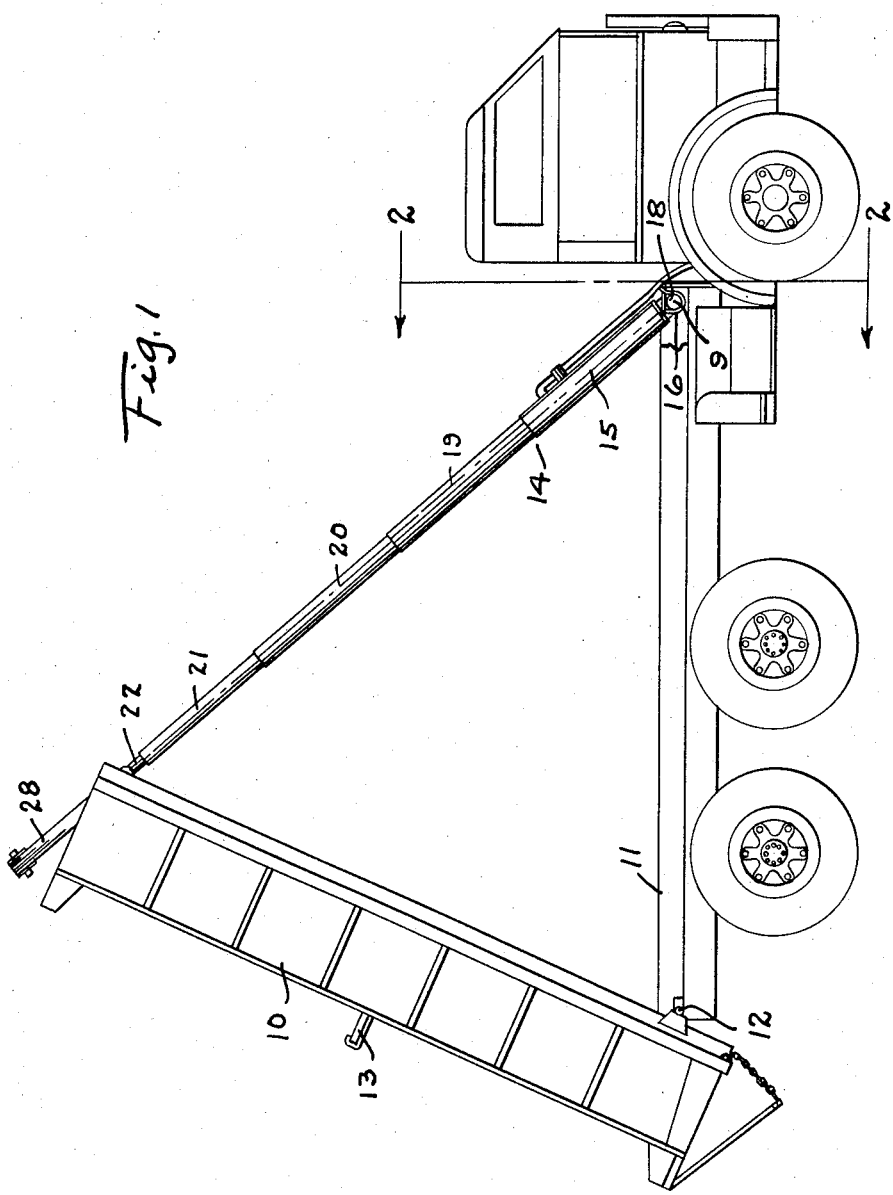

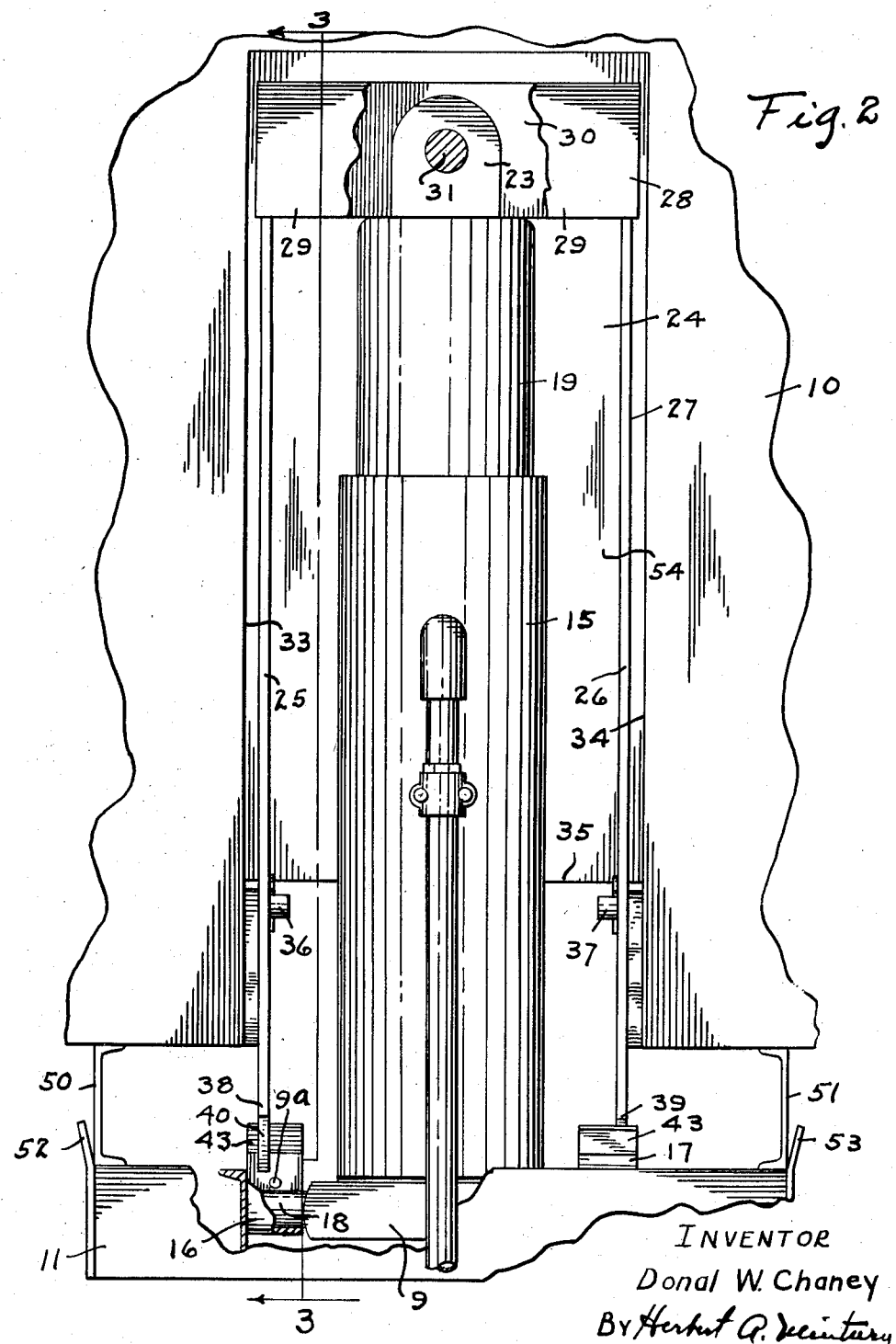

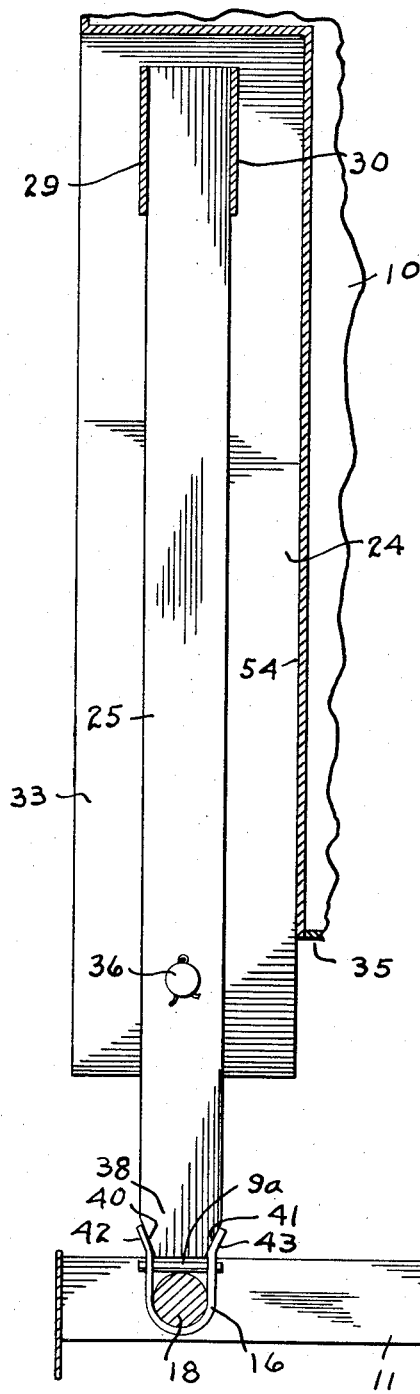

2,842,398
TRUCK DUMPING APPARATUS

Donal W. Chaney, Cambridge City, Ind., assignor to Converto Mfg. Co., Inc., Cambridge City, Ind., a corporation of Indiana Application July 28, 1955, Serial No. 524,958

3 Claims. (Cl. 298—22)

This invention relates to means for raising and lowering the bed of a truck commonly employed in the nature of a dump truck, wherein the bed is hinged toward the rear end of the chassis of the truck and there is a hydraulic jack employed to lift and lower the forward end of the body.

There are many advantages to be found in this invention. By use of a multi-cylinder jack, and by mounting the upper end of the jack in a bail, the rocking angle of the jack is considerably reduced and furthermore, there is little tendency for the extended jack to bend laterally of the truck.

There is also the advantage found in the present invention that, while the upper end of the jack is recessed within the forward end of the body when the body is in its horizontal or lowermost position, but little capacity of the body is lost by reason of the shallow recess permissibly used in this construction.

Further objects and advantages of course reside in the extreme durability and long life of the construction, together with trouble-free operation in the hands of the operators. These and many other objects and advantages of the invention will become apparent to those versed in the art in the following description of one particular form of the invention as illustrated in the accompanying drawings, in which Fig. 1 is a view in side elevation of a truck to which the invention is applied, the body being in the elevated position;

Fig. 2 is a view in vertical transverse section on the line 2—2 with the body in the lowered position; and Fig. 3 is a vertical longitudinal section on the line 3—3 in Fig. 2.

The body 10 is hinged in the usual manner at the rear end of the chassis 11 on the pivot axis 12. In the form herein shown, the bed 10 is of the elongated type such as is commonly employed by contractors in laying asphalt pavement, particularly where the truck body 10 is divided by any suitable means such as by the partition 13 so as to carry two different materials.

The lifting jack generally designated by the numeral 14 has a base cylinder 15 fixed to an axle 9 extending transversely across the chassis 11 to bear by ends within brackets 16 and 17 fixed to the chassis in any suitable manner. As indicated in Fig. 2, one of the ends of the axle 9 designated by the numeral 18 revolubly rides in the bracket 16. Both of these brackets 16 and 17 are identical in shape and size, and generally U-shaped. The axle 9 is retained in position in these brackets 16 and 17 by any suitable means, as herein shown as by a cross pin 9a extending through the bracket immediately above the axle. In this manner, the axle 9 is constrained to rocking about its own axis which is transverse of the chassis 11. Thus the cylinder 15 has to rock at right angles only to that axis. Telescoping successively one within the other are a plurality of extensible cylinders 19, 20, 21 and 22 and when the jack is in its normal non-extended condition, only a small end portion of the cylinder 19 will appear above the upper end of the cylinder 15, as indicated in Fig. 2. However, the smallest and end cylinder 22 will have an ear 23 extending above the upper end of the cylinder 19.

The front end of the body 10 is provided with a recess designated by the numeral 24 which is just deep enough in a fore and aft direction to receive therein the upper end portion of the cylinder 15. The transverse width of the recess 24 is wider than the diameter of the cylinder 15 so as to receive therein the legs 25 and 26 forming a bail generally designated by the numeral 27 and completed by the cross head 28 which is formed from two transversely extending plates 29 and 30 straddling the legs 25 and 26 at their upper ends and securely joined therewith by any suitable means as by welding.

The ear 23 extends upwardly between the two plates 29 and 30 and is secured centrally between the legs 25 and 26 by a pin 31 which extends through the two plates and is held thereby against longitudinal travel.

The legs 25 and 26 extend downwardly in parallel relation and in spaced relation from the sides 33 and 34, Fig. 2, to receive therethrough respectively and below the bottom 35 of the bed 10 pins 36 and 37 in that manner whereby the legs 25 and 26 are free to rock on those pins 36 and 37.

The legs 25 and 26 continue downwardly from those pins 36 and 37 to terminate by end portions 38 and 39 normally extending within the upper end portions of the brackets 16 and 17 when the truck body 10 is in its lowermost position. Each of these end portions 38 and 39 is given a form as indicated in Fig. 3 whereby the lower corners are beveled as at 40 and 41 to fit in a wedging manner between the outturned ears 42 and 43 of the brackets 16 and 17 respectively.

In operation, assuming that the body 10 has been elevated to its full dumping position as indicated in Fig. 1, the hydraulic jack 14 will be extended as indicated, and in which condition, the bail 28 will have been rocked to that position as indicated whereby the upper end of the bail will be rocked forwardly and upwardly from the recess 24.

Then when the jack 14 is operated to permit the various telescoping cylinders to come into that condition as illustrated in Fig. 2, the body 10 comes to rest on the chassis 11, normally being guided laterally in the last few inches of travel by having the longitudinal sills 50 and 51 slide downwardly between the ears 52 and 53 secured to the chassis, this particular directing means being old in itself.

However, the important factor in respect to the invention is that as the jack 14 becomes more and more telescoped the bail 28 rocks back into the recess 24, and the lower end portions 38 and 39 direct their respective ends between the bracket ears 42 and 43 thereby retaining the cylinder 15 and its connected telescoping cylinders in a fixed position against further rocking either toward the back wall 54 of the recess 24 or forwardly therefrom. In this manner, there is no fore and aft travel of the cylinder 15 as the truck may be operated over rough roads and the like. Furthermore, when the jack 14 is to be operated to lift the body and rock it about the axis 12, the bail 28 is quickly freed from contact with the brackets 16 and 17 upon a slight initial travel of the cylinders of the jacks, but only after the lifting operation has been started. By reason of this fact, the jack 14 cannot pull the bail 28 out of its alignment with the axis of the jack, and moreover the lift of the bed 10 is taken from the forward lower portion immediately below the floor 35.

Also it is to be noted that the jack 14 is confined by axle 9 at its lower end to fore and aft travel, whereas the upper end, that is the upper end of the last cylinder 22 has a rockable connection with upper end of the bail 28 about the pin 31 so that should the body 10 tend to twist slightly, the body may rock on the axis of that pin 31 without tending to bend jack 14 in its extended position.

While I have herein shown and described my invention in the one particular form, it is obvious that structural changes may be employed without departing from the spirit of the invention, and I therefore do not desire to be limited to that precise form beyond the limitations which may be imposed by the following claims.

I claim:

1. The combination with a dump truck having a chassis frame structure and a body hingedly carried by its rear end portion by a rear end portion of said structure and normally extending forwardly over said structure; of a jack hinged by a lower end portion to a portion of said structure at a location therealong to have the jack extend approximately vertically from the structure and in close proximity to the forward end of said body when in its said normal position; a bail comprising a pair of legs and an interconnecting cross head at one end of the legs; means rockably attaching the upper end of said jack to said cross head; means rockably attaching each of said legs at a zone intermediate their ends to a forward end portion of said body adjacent its floor level with said cross head uppermost; said legs extending downwardly a distance from their said rockable body attachments and terminating in free ends; brackets carried by said frame structure in the paths of the lower ends of said legs; said cross head being located above said zone and near the uppermost portion of said body forward end portion; said leg lower ends engaging and held against rocking by said brackets when said body is in said normal position and thereby restraining said jack against rocking.

2. The structure of claim 1 in which said body has a vertically extending walled recess in its forward end open from the forward side and closed across its upper end; said leg rockable attaching means being within said recess on opposing lateral sides thereof and those portions of said legs extending above their said rockable attachments lying within said recess in normal body position with the upper portion of said jack extending through the major part of said recess; said bail and bracket engagement maintaining the jack and the bail free of all contact with the walls and end of said recess.

3. The combination with a dump truck chassis; a body having a floor and resting normally over said chassis and hinged thereto at a rear portion thereof; a jack hinged to said chassis at the forward end of said body and extending upwardly therealong; a member rockably connected to an upper end portion of said jack and extending downwardly therealong; pivot means carried by a front portion of said body and adjacent its floor; said member being rockably carried by said pivot means and extending a distance therebelow to a free terminal end; and means carried by said chassis in the path of and engaging said terminal end when said body is in said normal position and restraining rocking of the member on said pivot means thereby restraining rocking of the jack.

References Cited in the file of this patent

UNITED STATES PATENTS

| 1,798,469 | Heil et al. | Mar. 31, 1931 |
| 1,925,296 | Barrett | Sept. 5, 1933 |
| 2,166,722 | Kirksey | July 18, 1939 |
| 2,539,086 | Kirksey | Jan. 23, 1951 |

OTHER REFERENCES

Garwood Industries, Inc., Bulletin 14, 9–34 15M, page 6, Fig. 12, September 1934.